(12) United States Patent
Hamm

(10) Patent No.: US 6,869,125 B2
(45) Date of Patent: Mar. 22, 2005

(54) GOLF CART SHADING SYSTEM

(76) Inventor: David Ray Hamm, 1944 W. Thunderbird Rd., #43, Phoenix, AZ (US) 85023

(*) Notice: Subject to any disclaimer, the term of this patent is extended or adjusted under 35 U.S.C. 154(b) by 0 days.

(21) Appl. No.: 10/618,504

(22) Filed: Jul. 10, 2003

(65) Prior Publication Data
US 2004/0007894 A1 Jan. 15, 2004

Related U.S. Application Data
(60) Provisional application No. 60/395,138, filed on Jul. 10, 2002.

(51) Int. Cl.[7] .................................................. B60J 7/00
(52) U.S. Cl. ........................................ 296/83; 296/145
(58) Field of Search ............................ 296/80, 81, 82, 296/83, 138, 140, 141, 145, 142, 143, 79

(56) References Cited

U.S. PATENT DOCUMENTS

| 4,013,315 | A | * | 3/1977 | West | 296/83 |
|---|---|---|---|---|---|
| 4,098,536 | A | * | 7/1978 | Mills | 296/77.1 |
| 5,588,690 | A | * | 12/1996 | Showalter | 296/77.1 |
| 5,741,041 | A | * | 4/1998 | Sullivan | 135/88.09 |
| 6,497,444 | B1 | * | 12/2002 | Simon | 296/83 |
| 6,547,304 | B1 | * | 4/2003 | Conner et al. | 296/79 |
| 6,701,948 | B2 | * | 3/2004 | Jopp et al. | 135/97 |
| 6,709,043 | B2 | * | 3/2004 | Beusse et al. | 296/100.16 |

* cited by examiner

Primary Examiner—Jason Morrow
(74) Attorney, Agent, or Firm—Stoneman Law Offices, Ltd.; Martin L. Stoneman; Benjamin K. Erlick

(57) ABSTRACT

A golf cart shading system shading of the occupants of a golf cart without limiting access to the rear golf cart storage area from the rear of the golf cart. Additionally, it provides a golf cart shade that is fitted to the golf cart, portable, easily installed and removed, and attachable to a wide range of golf cart designs. Even further, the shade has optional viewing windows with shade screening.

20 Claims, 10 Drawing Sheets

GOLF CART SHADING SYSTEM

CROSS-REFERENCE TO RELATED APPLICATIONS

The present application is related to applicant's prior U.S. Provisional Application No. 60/395,138, filed Jul. 10, 2002, entitled "Golf Cart Shading System", the contents of which are hereby herein incorporated by reference and are not admitted to be prior art with respect to the present invention by their mention in this cross-reference section.

BACKGROUND

This invention relates to a golf cart shading system. More particularly, it relates to a shading system for the shading of the occupants of a golf cart without limiting access to the storage area of the cart from outside the golf cart.

With the increased number of golf courses and number of individuals golfing, the use of golf carts for use on golf courses is increasing. Along with the increased numbers and use of golf carts, the need for a golf cart shading system also increases. More particularly, the use of golf carts is typically greater in regions where the weather is sunny and warm. In these areas, however, direct sunlight on the occupants can cause occupant overheating, discomfort, and associated skin problems.

OBJECTS OF THE INVENTION

A primary object and feature of the present invention is to provide a system for the shading of the occupant compartment(s) of a golf cart. In addition to providing shading, an additional object and feature of the present invention is to provide an enclosure, which assists in the climate control, including providing additional cooling, of the occupant compartment of a golf cart.

It is a further object and feature of the present invention to provide such a system that is fitted, portable, and easily installed and removed. It is an additional object and feature of the present invention to provide such a system that is simple to use and is attachable to a wide range of golf cart designs.

Additionally, it is an object and feature of the present invention to provide such a system that is foldable into a compact form that is easily stowed or carried. It is a further object and feature of the present invention to provide such a system that is easy to manufacture and assemble.

A further primary object and feature of the present invention is to provide such a system that is effective, inexpensive, and user friendly. Other objects and features of this invention will become apparent with reference to the following descriptions.

SUMMARY OF THE INVENTION

In accordance with a preferred embodiment hereof, this invention provides a golf cart shading system for at least one occupant compartment of a golf cart, comprising in combination: shading means for shading at least one rear portion of the at least one occupant compartment of the golf cart; and aperture means for permitting passage through such shading means of at least one rear support bracket for supporting at least one piece of golf equipment outside such shading means.

In accordance with another preferred embodiment hereof, this invention provides a golf cart shading system for at least one occupant compartment of a golf cart, comprising in combination: at least one shader structured and arranged to shade at least one rear portion of the at least one occupant compartment of the golf cart; and at least one aperture structured and arranged to permit passage through such at least one shader of at least one rear support bracket for supporting at least one piece of golf equipment outside such at least one shader. Moreover, it provides such a golf cart shading system further comprising at least one upper tensioner structured and arranged to apply tension to an upper portion of such at least one shader.

Additionally, it provides such a golf cart shading system further comprising at least one upper attacher structured and arranged to attach such at least one shader to at least one upper portion of the golf cart. Also, it provides such a golf cart shading system further comprising at least one lower attacher structured and arranged to attach such at least one shader to at least one lower portion of the golf cart. In addition, it provides such a golf cart shading system wherein such at least one shader comprises at least one holder structured and arranged to hold at least one personal item of the at least one occupant.

And, it provides such a golf cart shading system wherein such at least one shader comprises at least one holder structured and arranged to hold at least one personal item of the at least one occupant. Further, it provides such a golf cart shading system further comprising at least one lower tensioner structured and arranged to apply tension to at least one lower portion of such at least one shader. Even further, it provides such a golf cart shading system wherein such at least one shader comprises at least one viewer structured and arranged to assist the at least one occupant viewing out the at least one rear portion of the at least one occupant compartment of the golf cart.

Furthermore, it provides such a golf cart shading system wherein such at least one shader comprises at least one viewer structured and arranged to assist the at least one occupant viewing out the at least one rear portion of the at least one occupant compartment of the golf cart. Additionally, it provides such a golf cart shading system wherein such at least one shader comprises at least one viewer structured and arranged to assist the at least one occupant viewing out the at least one rear portion of the at least one occupant compartment of the golf cart. Also, it provides such a golf cart shading system wherein such at least one viewer comprises at least one sunlight controller structured and arranged to control a quantity of sunlight passing through such at least one viewer.

In addition, it provides such a golf cart shading system wherein such at least one viewer comprises at least one cover adapted to cover such at least one viewer. And, it provides such a golf cart shading system wherein such at least one viewer comprises at least one cover adapted to cover such at least one viewer. Further, it provides such a golf cart shading system further comprising at least one holder structured and arranged to hold at least one personal item of the at least one occupant. Even further, it provides such a golf cart shading system further comprising at least one golf cart. Even further, it provides such a golf cart shading system further comprising at least one golf cart.

In accordance with another preferred embodiment hereof, this invention provides a kit comprising: at least one golf cart shading system for at least one occupant compartment of a golf cart, comprising in combination: shading means for shading at least one rear portion of the at least one occupant compartment of the golf cart; and aperture means for permitting passage through such shading means of at least one rear support bracket for supporting at least one piece of golf equipment outside such shading means; at least one storage bag; and at least one set of installation instructions. Even further, it provides such a kit wherein such shading means comprises viewing means for assisting viewing out the at least one rear portion of the at least one occupant compartment of the golf cart. Even further, it provides such a kit wherein such shading means comprises holding means for holding at least one personal item of the at least one occupant.

DETAILED DESCRIPTION OF A PREFERRED EMBODIMENT OF THE INVENTION

Figure 1:
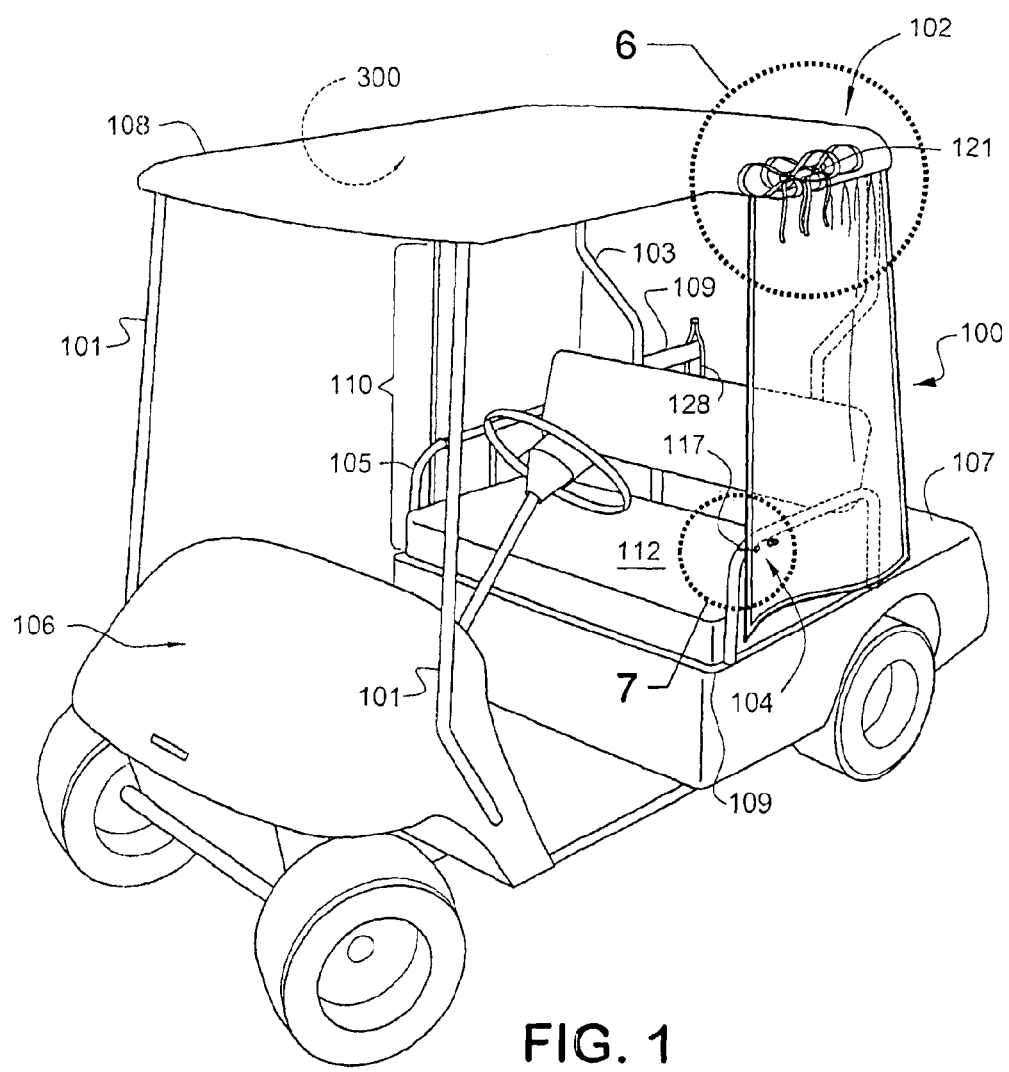
FIG. 1 is a perspective view of the golf cart shading system as attached to a golf cart according to a preferred embodiment of the present invention.

Referring now to the drawings, FIG. 1 is a perspective view of the golf cart shading system 100 illustrating the use of attaching systems, an upper attaching system 102 and lower attaching system 104, as attached to a golf cart 106, according to a preferred embodiment of the present invention. The golf cart 106 typically includes a roof 108 and a rear portion of the occupant compartment 110, having a seating area(s)112. Additionally, the golf cart typically includes front roof supports 101 and rear roof supports 103, armrest(s) 105, a rear storage compartment 107, and rear equipment support bracket(s) 109.

Figure 2:
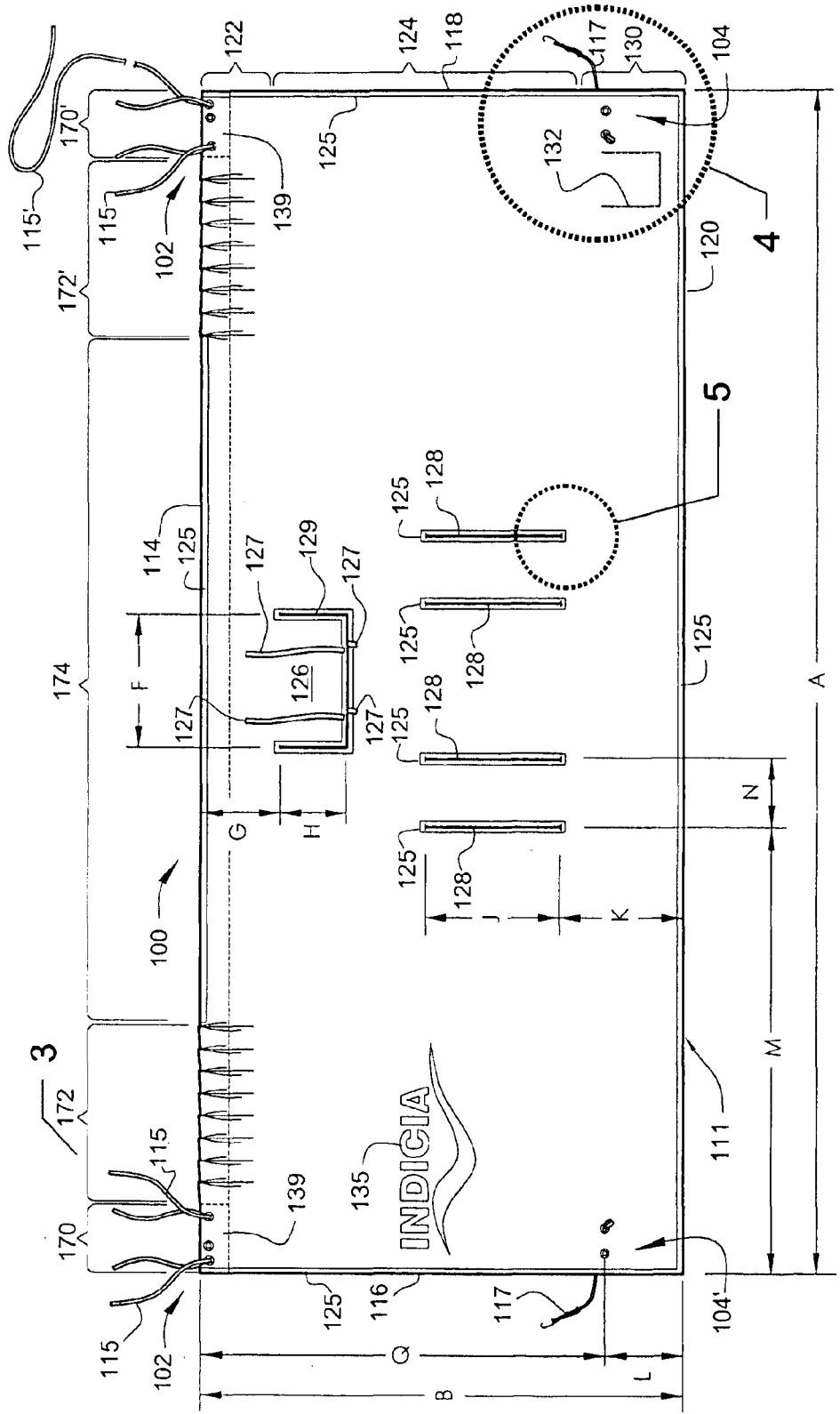
FIG. 2 is a diagrammatic top view for diagrammatically illustrating dimensions of the golf cart shading system of FIG. 1.

FIG. 2 is a diagrammatic top view for diagrammatically illustrating dimensions of the golf cart shading system 100 of FIG. 1. In a preferred embodiment, the golf cart shading system 100 preferably comprises a shade-body 111 (embodying herein shading means for shading at least one rear portion of the at least one occupant compartment of the golf cart; and embodying herein at least one shader structured and arranged to shade at least one rear portion of the at least one occupant compartment of the golf cart), which is essentially rectangular, as shown. The shade-body 111 of the golf cart shading system 100 most preferably comprises a high-grade twill material. Upon reading the teachings of this specification, those with ordinary skill in the art, will now understand that, under appropriate circumstances, considering issues such as user preference, economic considerations, environmental considerations, durability, etc., other materials, such as denim, vinyl, netting, or screening-type fabric, may suffice. In a preferred embodiment, length A is the length of the shade-body 111 needed to surround the rear portion of the occupant compartment 110 of a golf cart 106. Under appropriate circumstances, for example, using a standard E-Z-Go® golf cart, available from E-Z-Go Textron, Augusta, Ga., USA, length A is preferably about one-hundred-four inches. Upon reading the teachings of this specification, those with ordinary skill in the art, will now understand that, under appropriate circumstances, considering issues such as golf cart size, etc., other dimension of length A, such as shorter or longer, may suffice. In a preferred embodiment, width B is the width of the shade-body 111 needed to cover from about the roof 108 to about the bottom 109 of the seating area(s) 112 of the rear portion of the occupant compartment 110. Under appropriate circumstances, for example, using a standard E-Z-Go® golf cart, width B is preferably about forty-three-inches. Upon reading the teachings of this specification, those with ordinary skill in the art, will now understand that, under appropriate circumstances, considering issues such as golf cart size, etc., other dimensions of width B, such as wider or narrower, may suffice.

Reference is now made to FIG. 2 with continued reference to FIG. 1. As shown in FIG. 2, the shade-body 111 preferably includes a top section 122, a middle section 124, and a bottom section 130. Also, as shown, the shade-body 111 preferably includes a top edge 114, a first side edge 116, a second side edge 118, and a bottom edge 120. Preferably, the periphery of the first side edge 116, second side edge 118, and the bottom edge 120 are finished with bias tape 125, which is commonly known and widely available for use in finishing raw edges of fabric or other materials. Upon reading the teachings of this specification, those with ordinary skill in the art, will now understand that, under appropriate circumstances, considering issues such as user preference, economic considerations, environmental considerations, durability, etc., other methods of finishing the first side edge 116, second side edge 118, and the bottom edge 120, such as rolled edges, seams, etc., may suffice.

Figure 3A:
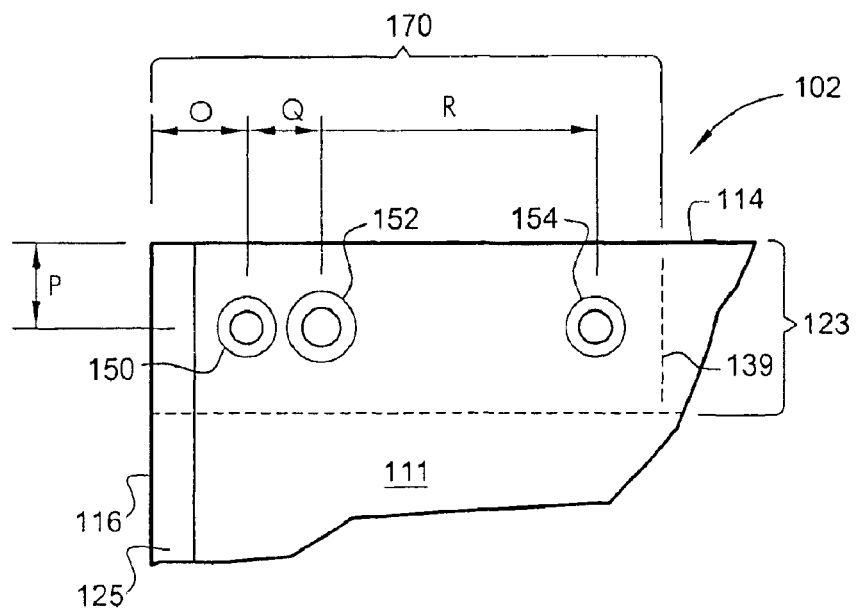
FIG. 3a is a top view, partially in section, of Detail 3 of FIG. 2 showing the uninstalled grommet positions of the upper attaching system.

Top section 122 of the shade-body 111 preferably includes a top hem 123 of preferably about two-inches over the entire length A, top edge 114, first side edge 116, and second side edge 118. The top section 122 of the shade-body 111 preferably also includes first end portions 170 and 170', second end portions 172 and 172', and a middle portion 174, as shown. Preferably, the first end portions 170 and 170' comprise the upper attaching system 102. First end portions 170 and 170', most preferably, are six-inches in length from the first side edge 116 and the second side edge 118, respectively, with each first end portion 170 and 170' each comprising, preferably, at least two upper tie straps 115 (or at least one upper tie strap 115 and at least one fifty-two-inch upper tie strap 115') and three upper grommets, of a typical type, a first upper grommet(s) 150, a second upper grommet (s) 152, and a third upper grommet(s) 154, as shown in FIG. 3a (for a total of preferably at least three upper tie straps 115, and at least one fifty-two-inch upper tie strap 115', and at least six upper grommets 150, 152 and 154). First end portions 170 and 170' are preferably reinforced with additional reinforcing material 139, as shown. Preferably, the additional reinforcing material 139 is about a four-inch by six-inch piece of material folded and sewn onto the corner of the shade-body 111 before the top hem 123 is sewn. Additional details concerning the upper attaching system 102 are provided in FIGS. 3a and 3b.

The second end portions 172 and 172' of top section 122 of the shade-body 111 preferably include elastic fixed within the top hem 123. Preferably, the second end portions 172 and 172' are used as tensioners to aid in a tighter fit of the golf cart shading system 100 when installed on the golf cart 106 (this arrangement embodying herein at least one upper tensioner structured and arranged to apply tension to an upper portion of such at least one shader). Under appropriate circumstances, for example, using a standard E-Z-Go® golf cart, when stretched, each of the second end portions 172 and 172' are preferably about nine and one-half-inches in length. Upon reading the teachings of this specification, those with ordinary skill in the art, will now understand that, under appropriate circumstances, considering issues such as golf cart dimensions, user preference, economic considerations, environmental considerations, durability, etc., the length of second end portions 172 and 172' such as longer or shorter, may suffice.

The middle portion 174 of top section 122 of the shade-body 111 is preferably flat, so as to be taut against the rear roof supports 103 and under the roof 108 of the golf cart 106. Most preferably, the middle portion 174 is finished with bias tape 125 to provide additional protection of the material against wear. However, under appropriate circumstances, additional protection of the material of middle portion 174 of top section 122 of the shade-body 111 may be accomplished by other suitable means, such as a rolled edge, or reinforced with additional material. Under appropriate circumstances, for example, using a standard E-Z-Go® golf cart, the length of middle portion 174 is most preferably about thirty-three-inches. Upon reading the teachings of this specification, those with ordinary skill in the art, will now understand that, under appropriate circumstances, considering issues such as golf cart dimensions, user preference, etc., other dimensions of middle portion 174, such as longer or shorter, may suffice.

Middle section 124 of the shade-body 111 preferably includes a first side edge 116, a second side edge 118, a window 129, a window flap 126 (also see FIG. 13) and slot(s) 128. Additionally, the middle section 124 is sized such that indicia 135 may be placed appropriately for advertising, owner identification, etc. The window 129, as shown, is preferably centered equidistant from the first side edge 116 and the second side edge 118, and at a distance G from the top edge 114 of shade-body 111. Under appropriate circumstances, for example, using a standard E-Z-Go® golf cart, the distance G is preferably about seven-inches. Upon reading the teachings of this specification, those with ordinary skill in the art, will now understand that, under appropriate circumstances, considering issues such as golf cart dimensions, user preference, etc., other dimensions of distance G, such as longer or shorter, may suffice.

Figure 13:
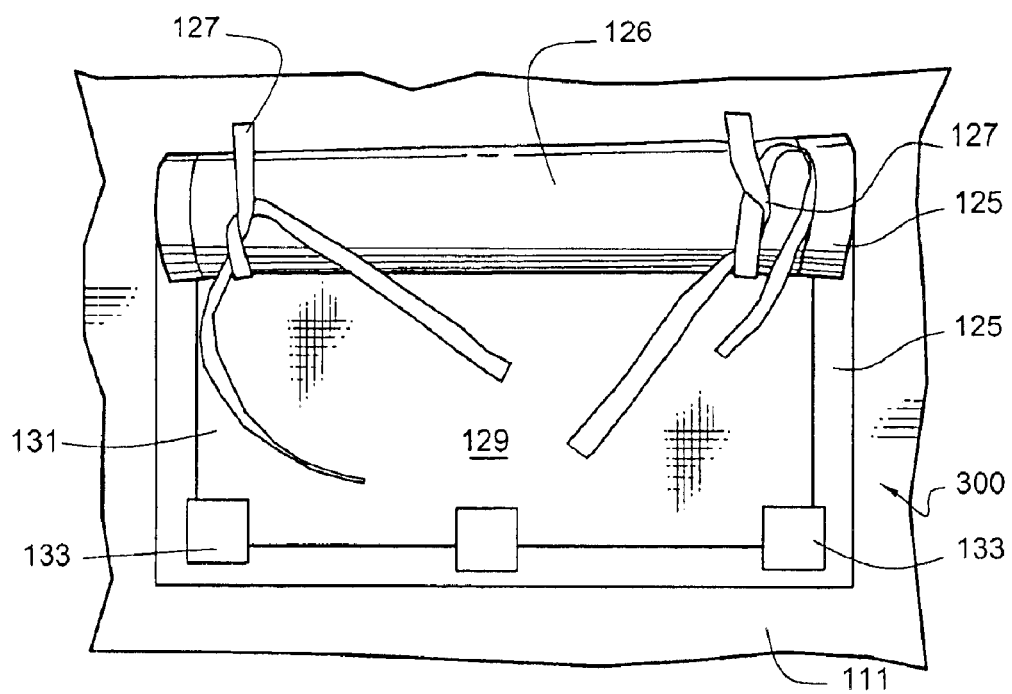
FIG. 13 is a perspective view, partially in section of screening in an optional window of the golf cart shading system.

Reference is now made to FIG. 13 in addition to the above referenced Figures. FIG. 13 shows the window 129, screening 131, and window flap attacher(s) 133, with window flap 126 tied up by the window flap ties 127.

The window 129 (embodying herein wherein such at least one shader comprises at least one viewer structured and arranged to assist the at least one occupant viewing out the at least one rear portion of the at least one occupant compartment of the golf cart; and embodying herein wherein such shading means comprises viewing means for assisting viewing out the at least one rear portion of the at least one occupant compartment of the golf cart) preferably has two sides of height H, preferably about six-inches, and a top and bottom of length F, preferably about twelve-inches. Preferably, the window 129 includes a window flap 126 (embodying herein wherein such at least one viewer comprises at least one cover adapted to cover such at least one viewer), which is open on its two sides and bottom and can be tied up out of the path of an occupant's view by at least two sets of window flap ties 127. Both the sides and bottom of the window 129 opening and the window flap 126 are preferably finished with bias tape 125. Upon reading the teachings of this specification, those with ordinary skill in the art, will now understand that, under appropriate circumstances, considering issues such as user preference, economic considerations, environmental considerations, durability, etc., other methods of finishing the window 129 and window flap 126, such as rolled edges, seams, etc., may suffice.

Preferably, when the window flap 126 is not tied up out of the path of an occupant's view, it is preferably attached to the golf cart shading system 100 by use of a window flap attacher(s) 133, preferably hook and loop material, preferably placed at locations along the bottom edge of the inside of the window flap 126 and the edge of the bottom of the window 129, as shown in FIG. 13. Upon reading the teachings of this specification, those with ordinary skill in the art, will now understand that, under appropriate circumstances, considering issues such as user preference, economic considerations, environmental considerations, durability, etc., other attaching means, such as snaps, hooks, or buttons, etc., may suffice.

In a preferred embodiment, the window 129 is created when the window flap 126 is tied up. Preferably, the window 129 is comprised of screening 131 (embodying herein wherein such at least one viewer comprises at least one sunlight controller structured and arranged to control a quantity of sunlight passing through such at least one viewer). The screening 131 is preferably accomplished by attaching, most preferably, by sewing a screen-type material to the underside 300 of the golf cart shading system 100. Preferably, the screening 131 is about one-inch larger in length and width than the window 129. The at least two sets of window flap ties 127 are preferably attached to the golf cart shading system 100 by an appropriate attaching method, most preferably sewn, and are preferably of sufficient length to hold the rolled up window flap 126 up such that the window flap 126 can be tied and stowed. Upon reading the teachings of this specification, those with ordinary skill in the art, will now understand that, under appropriate circumstances, considering issues such as user preference, economic considerations, etc., other methods of holding the window flap 126, such as hook and loop fasteners, hooks, snaps or buttons, etc., may suffice.

Preferably, the at least two sets of window flap ties 127 are attached at about two-inches inside from each of the sides of the window flap 126, as shown. Preferably, one portion of the set of ties being attached between the screen material and the window flap 126 (under the flap), and the other portion of the set of ties being attached at about one-inch above the window flap 126 (over the flap). Upon reading the teachings of this specification, those with ordinary skill in the art, will now understand that, under appropriate circumstances, considering issues such as user preference, economics, etc., use of a window or window flap is optional, and other windows or widow closers, screening, non-screening, etc., may suffice.

Continued reference is made to FIG. 2. The slots 128 (embodying herein aperture means for permitting passage through such shading means of at least one rear support bracket for supporting at least one piece of golf equipment outside such shading means; and embodying herein at least one aperture structured and arranged to permit passage through such at least one shader of at least one rear support bracket for supporting at least one piece of golf equipment outside such at least one shader), most preferably four in number, are preferably positioned such that the rear storage compartment 107 rear equipment support bracket(s) 109 can easily pass through. This placement allows for unfettered access from outside the golf cart 106 to golf clubs and equipment that may be stored in the rear storage compartment 107 of the golf cart 106 and allows the golf cart shading system 100 to fit closer around the rear portion of the occupant compartment 110. Under appropriate circumstances, for example, using a standard E-Z-Go® golf cart, length J, length of slot(s) 128, is preferably about twelve-inches; distance K, placement of slot(s) 128 from the bottom edge 120 is preferably about eleven-inches; with the first of the preferably four slot(s) 128 positioned distance M, preferably about forty-inches, from the first side edge 116; the second slot positioned distance N from the first slot, preferably about six-inches; with the third and fourth slots preferably placed like distances from the second side edge 118. Upon reading the teachings of this specification, those with ordinary skill in the art, will now understand that, under appropriate circumstances, considering issues such as golf cart dimensions, user preference, etc., other dimensions of length J, distance K, distance M, and distance N, such as longer or shorter, may suffice.

Preferably, the four slots 128 are finished with bias tape 125, (further detailed in FIG. 5) which is commonly known and widely available for use in finishing raw edges of fabric or other materials. As stated above, such raw edges may be finished with a rolled edge or other acceptable finishing method.

Preferably, the bottom section 130 of the shade-body 111 includes a first side edge 116, a second side edge 118, a bottom edge 120, the lower attaching system 104, and at least one internal pocket 132, as shown. Preferably, lower attaching system 104 (embodying herein at least one lower attacher structured and arranged to attach such at least one shader to at least one lower portion of the golf cart) includes at least two lower grommets, first lower grommet(s) 156 and second lower grommet(s) 158, and lower bungee cord 117 (embodying herein at least one lower tensioner structured and arranged to apply tension to at least one lower portion of such at least one shader). In a preferred embodiment, there is a lower attaching system 104 for each side (driver and passenger sides) of the golf cart shading system 100, with both lower attaching systems 104 and 104' preferably positioned such that they are easily attached, preferably hooked by a lower bungee cord(s) 117, around each respective armrest(s) 105 of the seating area 112. Upon reading the teachings of this specification, those with ordinary skill in the art, will now understand that, under appropriate circumstances, considering issues such as user preference, economic considerations, etc., other methods of attaching each side (driver and passenger sides) of the golf cart shading system 100, such as hook and loop, snap, or fabric or leather ties, etc, may suffice.

Preferably, the centerline of the first lower grommet 156 and second lower grommet 158 are located at distance L from the bottom edge 120. Under appropriate circumstances, for example, using a standard E-Z-Go® golf cart, distance L, the distance from the centerline of the lower grommets is placed from the bottom edge 120, is preferably about five-inches. Under appropriate circumstances, distance L may also be longer or shorter, depending on the specific type of golf cart for which the golf cart shading system 100 has been designed. Also, the distance Q, the distance from about the roof 108 to the centerline of the lower grommets 256 and 258, is preferably about 38 inches. Under appropriate circumstances, the distance Q may vary, depending on the type of golf cart for which the golf cart shading system is designed. Additional details concerning the lower attaching systems 104 and 104' are provided in FIG.4.

In addition to providing shading, under appropriate circumstances, the present invention also assists in climate control within the rear portion of the occupant compartment 110 of a golf cart 106. For example, it may protect the rear portion of the occupant compartment 110 from dust, wind, rain or other undesired elements. Preferably, the golf cart shading system 100 provides cooling of the rear portion of the occupant compartment 110 by the air circulation created by the enclosure of the shade-body 111.

Figure 3B:
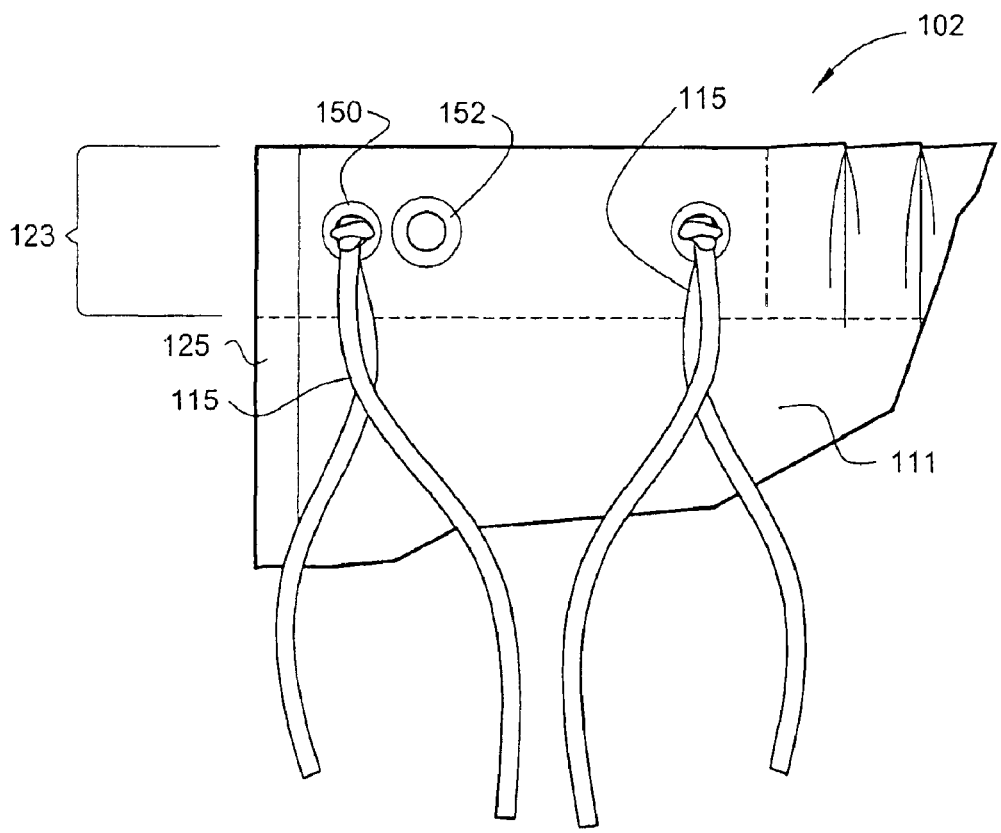
FIG. 3b is a top view, partially in section, of Detail 3 of FIG. 2 showing the installed grommet positions.
Figure 8:
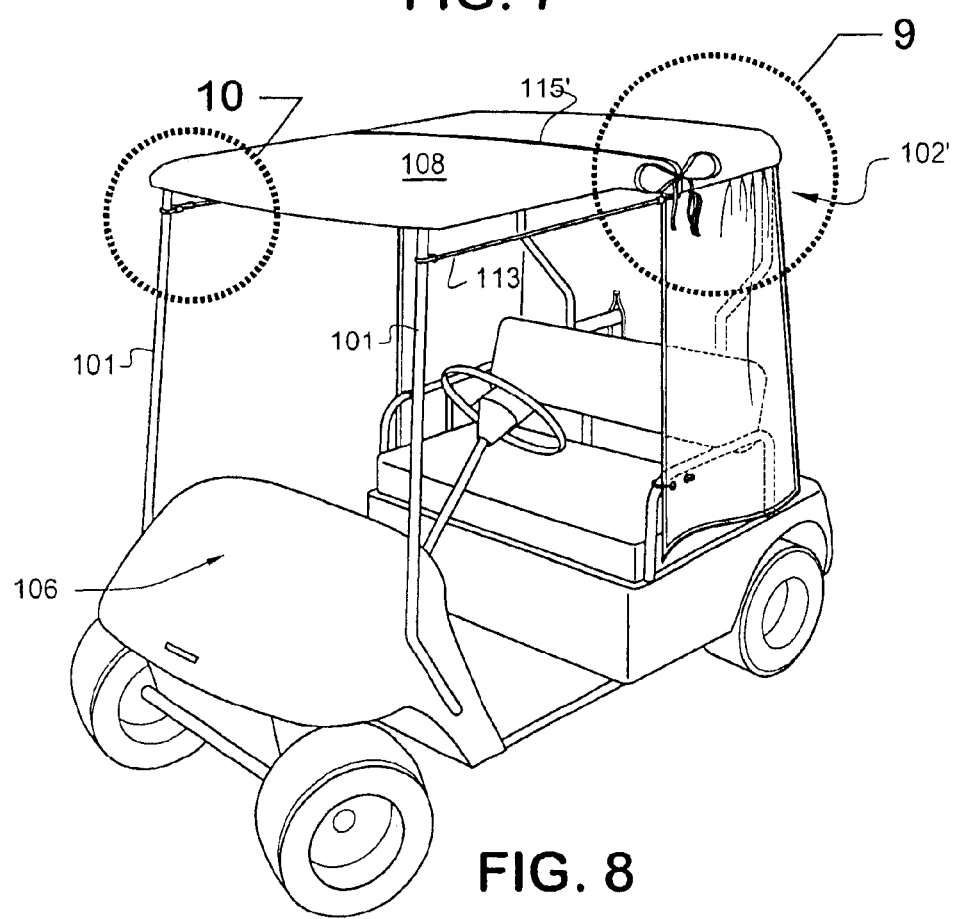
FIG. 8 is a perspective view of the golf cart shading system illustrating the use of an alternate upper attaching system according to another preferred of the present invention.
Figure 9:
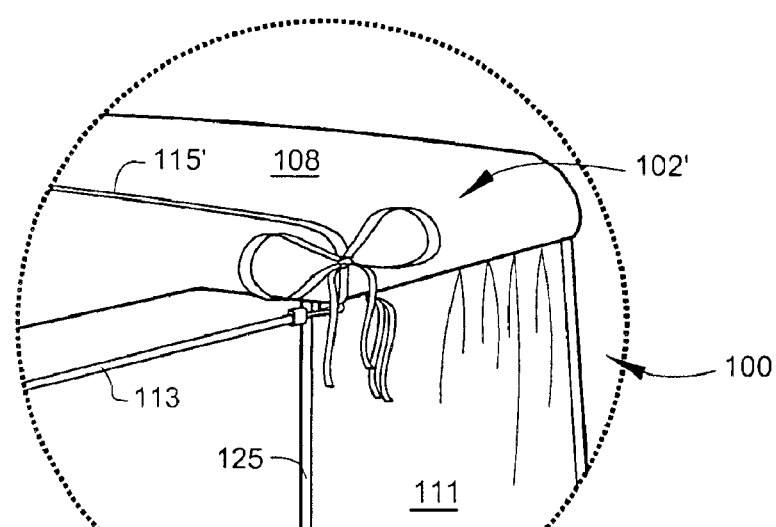
FIG. 9 is a perspective view of Detail 9 of FIG. 8.
Figure 10:
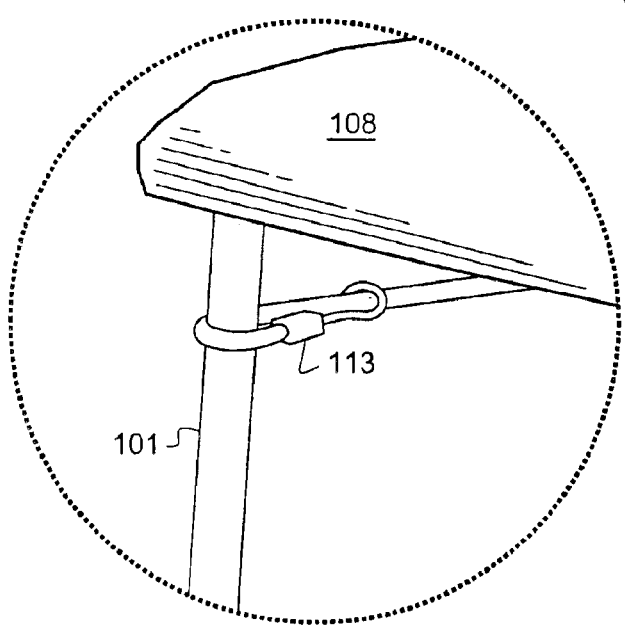
FIG. 10 is a perspective view of Detail 10 of FIG. 8.

It should be noted that upon reading the teachings of this specification, those with ordinary skill in the art, will now understand that, under appropriate circumstances, considering issues such as alternate physical dimensions of golf carts, golf cart users, shipping considerations, multiple occupant seating arrangements, etc., other dimensions of the components described above, may suffice. FIG. 3A is a top view, partially in section, of Detail 3 of FIG. 2 showing the uninstalled grommet positions of the upper attaching system 102. The upper attaching system 102 (embodying herein at least one upper attacher structured and arranged to attach such at least one shader to at least one upper portion of the golf cart) preferably includes upper tie straps 115 and 115', as shown in FIG. 3b, an upper bungee cord 113, as shown in FIG. 8, FIG. 9, and FIG. 10 (used in an alternative upper attaching system 102' method), at least three upper grommets, a first upper grommet(s) 150, a second upper grommet(s) 152, and a third upper grommet(s) 154, and additional reinforcing material 139. The first end portion 170 of the top section 122 of the shade-body 111, most preferably, is six-inches in length from the first side edge 116. The additional reinforcing material 139, as previously described in FIG. 2, preferably reinforces the entire area of the first end portions 170 and 170'. Preferably, the first upper grommet 150 is a one-quarter-inch-inside-diameter grommet. The centerline of the first upper grommet 150 is preferably placed at distance O, preferably about one and one-eighth-inches, from the first side edge 116, with the centerline of the first upper grommet 150 preferably placed at distance P, preferably about one-inch, from top edge 114 (about the center of the two-inch top hem 123). The first upper grommet 150 is preferably used to secure an upper tie strap 115, as shown in FIGS. 2 and 3b. The second upper grommet 152 is preferably a three-eighths-inch-inside-diameter grommet preferably placed at distance Q, preferably about seven-eighths-inches, from the centerline of the first upper grommet 150 and preferably with the centerline of the second upper grommet 152, and preferably placed at distance P, preferably about one-inch, from top edge 114 (about the center of the two-inch top hem 123). The second upper grommet 152 is preferably used to secure an upper bungee cord 113, as shown in FIG. 8 and FIG. 9, for use in an alternate preferred upper attaching system 102' method. (This alternate attaching method is more fully described in FIG. 8, FIG. 9, and FIG. 10) The third upper grommet 154 is preferably a one-quarter-inch-inside-diameter grommet with the centerline of the third upper grommet 154 preferably placed at distance R, about three and one-quarter-inches, from the centerline of the second upper grommet 152, and preferably placed at distance P, preferably about one-inch, from top edge 114 (about the center of the 2-inch top hem 123). The third upper grommet 154 is preferably used to secure an upper tie strap 115, as shown in FIGS. 2 and 3b. Preferably, the first upper grommet(s)150, second upper grommet(s) 152 and third upper grommet(s) 154 are comprised of brass. Upon reading the teachings of this specification, those with ordinary skill in the art, will now understand that, under appropriate circumstances, considering issues such as economics, durability, etc., other suitable material, such as corrosion-resistant metal, plastic, etc., may suffice.

Most preferably, there is an upper attaching system, 102 and 102', for each side (driver and passenger sides) of the golf cart shading system 100. FIG. 3B is a top view, partially in section, of Detail 3 of FIG. 2 showing the installed grommet positions. Preferably, the upper tie strap(s) 115 and 115' (as detailed in FIG. 2) are most made of shoelace grade rawhide and are of sufficient length to tie or attach onto the roof 108 with at least one of the upper tie strap(s) 115' long enough to strap over the width of the roof 108, as shown in FIG. 2. Under appropriate circumstances, for example, using a standard E-Z-Go® golf cart, the length of at least three of the upper tie straps 115 is preferably twenty-four inches and the length of the fourth upper tie strap 115' is preferably fifty-two-inches long. Preferably, the twenty-four inch length upper tie straps 115 are secured through the grommet as follows: a bead is placed in the middle of the twenty-four inch tie straps and both ends of the tie strap are then threaded through the grommet (the bead prevents the tie strap from pulling through the grommet); both ends of the tie strap are then threaded through a slide bead, of a typical type, which is pulled to the grommet to secure the tie strap. Preferably, the fifty-two-inch upper tie strap 115' is secured through the grommet as follows: a bead is placed at about twelve-inches from one end of the tie strap and both ends of the tie strap then are threaded through the grommet (the bead prevents the tie strap from pulling through the grommet); both ends of the tie strap are then threaded through a slide bead, of a typical type, which is pulled to the grommet to secure the tie strap. Preferably, it is the forty-inch length of the upper tie strap 115' that is used to tie over the roof 108 of the golf cart 106, as shown in FIG. 8 and FIG. 9. The fifty-two-inch upper tie strap 115' is preferably located on the first upper grommet 150 on the passenger side of the golf cart shading system 100. Upon reading the teachings of this specification, those with ordinary skill in the art, will now understand that, under appropriate circumstances, considering issues such as golf cart dimensions, economical considerations, durability, etc., other suitable materials for the upper tie strap(s) 115 and 115', such as, for example, material similar to the golf cart shading system 100, bungee cords, etc., may suffice.

Figure 4A:
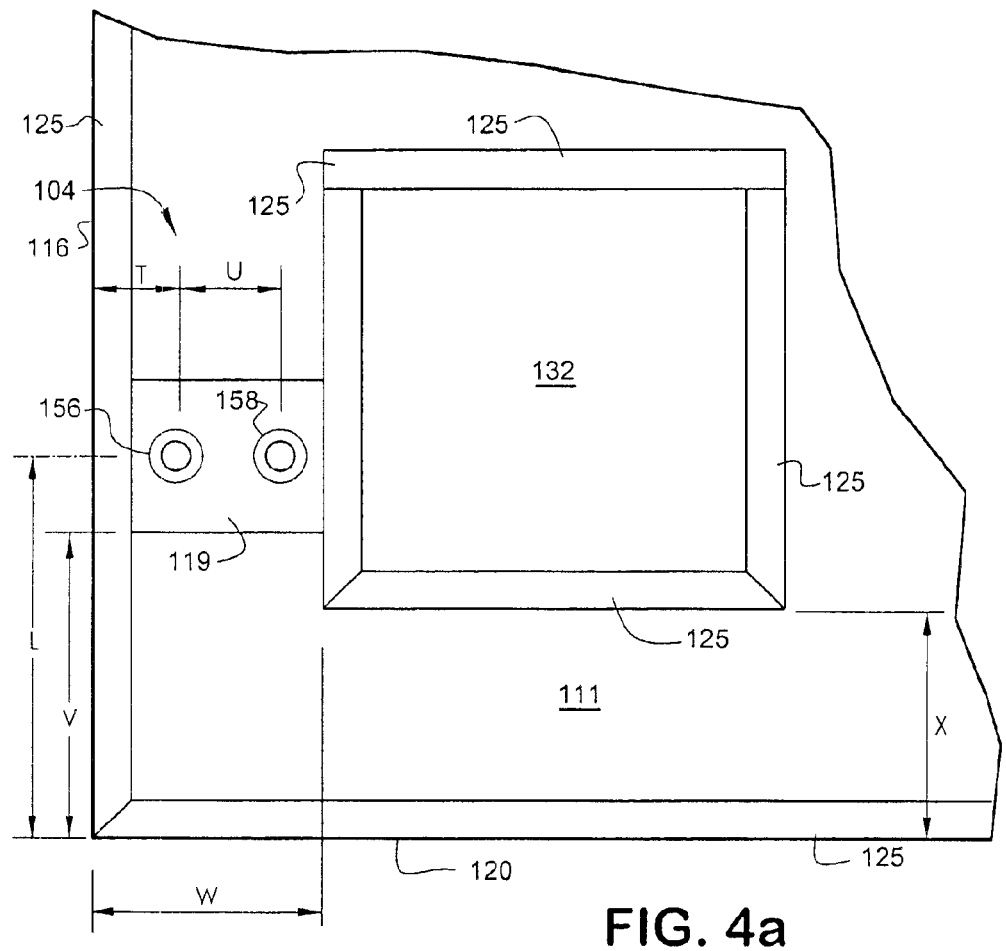
FIG. 4a is an underside view, partially in section, of Detail 4 of FIG. 2. for diagrammatically illustrating dimensions
Figure 4B:
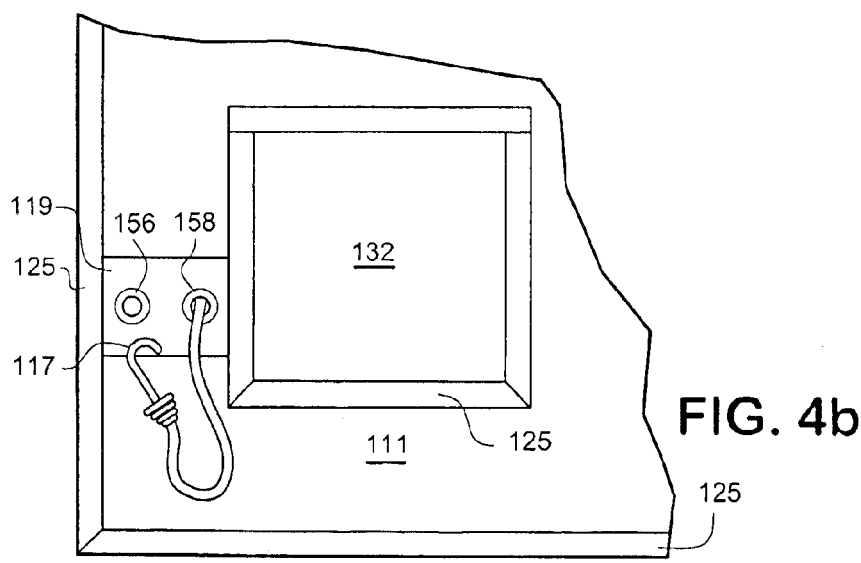
FIG. 4b is another underside view, partially in section, of Detail 4 of FIG. 2.

FIG. 4a is an underside view, partially in section, of Detail 4 of FIG. 2. for diagrammatically illustrating dimensions. FIG. 4a shows a preferred dimensional layout view of the lower attaching system 104 and internal pocket 132 (embodying herein wherein such at least one shader comprises at least one holder structured and arranged to hold at least one personal item of the at least one occupant; and embodying herein such shading means comprises holding means for holding at least one personal item of the at least one occupant), according to preferred embodiments of the present invention. The lower attaching system 104 preferably includes at least two lower grommets, a first lower grommet 156 and a second lower grommet 158, a small lower bungee cord 117, and lower reinforcement 119, as shown in FIG. 4b. There is a lower attaching system 104 and 104' for each side (driver and passenger sides) of the golf cart shading system 100.

The first lower grommet 156 and second lower grommet 158 are preferably one-quarter-inch-inside-diameter grommets. The centerline of the first lower grommet 156 and second lower grommet 158 is preferably distance L from the bottom edge 120, preferably about five-inches. The centerline of first lower grommet 156 is preferably positioned a distance T from the first side edge 116, preferably about one and one-quarter-inches. Preferably, the centerline of the second lower grommet 158 is distance U from the centerline of the first lower grommet 156, preferably about one and one-half-inches. Preferably, the first lower grommet(s) 156 and the second lower grommet(s)158 are comprised of brass, however, under appropriate circumstances, may be comprised of other suitable material, such as a corrosion-resistant metal, or a plastic. The area surrounding the first lower grommet 156 and the second lower grommet 158 is preferably reinforced by attaching a lower reinforcement 119. The lower reinforcement 119 is attached preferably by sewing, prior to installing the lower grommets 156 and 158, a similar piece of material as is used for the shade-body 111, preferably sized about four-inches by six-inches and folded in half (becomes about two-inches by about three-inches). The lower reinforcement 119 is placed preferably at a distance V from the bottom edge 120, with distance V preferably about four-inches, and at the edge of the bias tape 125, as shown in FIG. 4b.

At least one internal pocket 132 is preferably made from material matching the material used for the shade-body 111, and is preferably about five and one-half-inches by about five and three-quarters-inches, with preferably all sides of the internal pocket 132 finished with bias tape 125. Upon reading the teachings of this specification, those with ordinary skill in the art, will now understand that, under appropriate circumstances, considering issues such as user preferences, economic considerations etc., other methods and materials for the internal pocket 132 and shade-body 111, may suffice. For example, the internal pocket 132 may be made from a different material than the shade-body 111, may be larger or smaller, and may be finished by other appropriate finishing methods, such as a rolled edge or hemmed.

Preferably, the internal pocket 132 is attached to the internal side of the shade-body 111 at a distance W from the side edge 116 and distance X from the bottom edge 120, with W preferably about three-inches and X preferably about three-inches. Upon reading the teachings of this specification, those with ordinary skill in the art, will now understand that, under appropriate circumstances, considering issues such as user preferences, economic considerations, durability, etc., the internal pocket 132 may be attached to the internal side of the shade-body 111 by other appropriate means, such as, for example, glued, grommets, hook and loop fasteners, etc. and may be placed in a different location, depending on the specific type of golf cart for which the golf cart shading system 100 is designed. Additionally, under appropriate circumstances, there may be more than one internal pocket 132, and it may be larger or smaller.

FIG. 4b is another underside view, partially in section, of Detail 4 of FIG. 2. FIG. 4b shows the lower attaching system 104 and internal pocket 132, according to preferred embodiments of the present invention.

Figure 5:
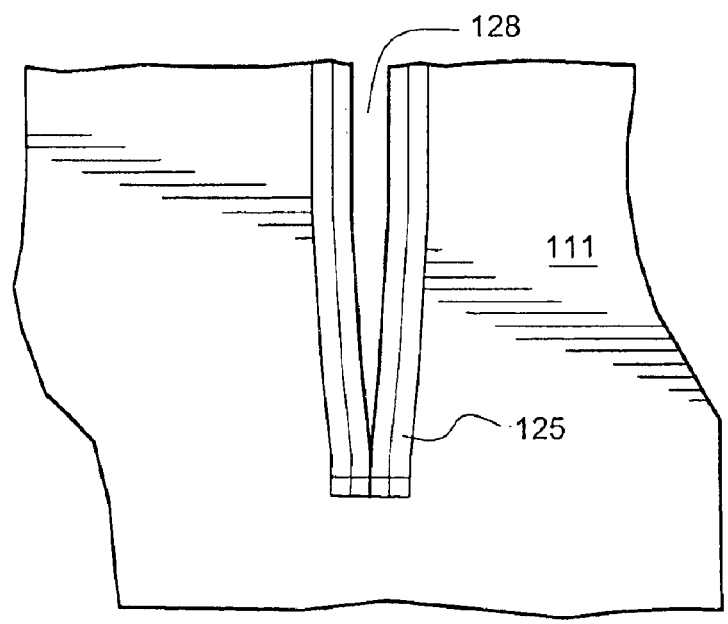
FIG. 5 is a top view, partially in section of the pass-through slots, according to preferred embodiments of the present invention.

FIG. 5 is a top view of a pass-through slot 128, according to preferred embodiments of the present invention. As shown, the edges of the slot 128 are preferably finished with bias tape 125. But as previously discussed, under appropriate circumstances, the edges of the slot(s) 128 may be finished with other acceptable finishing means, such as rolled edges or hemmed.

Figure 6:
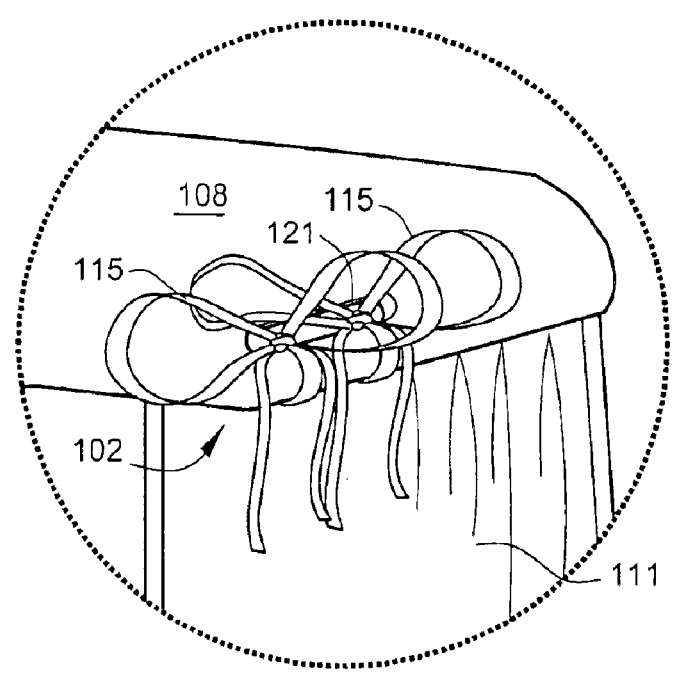
FIG. 6 is a perspective view of Detail 6 of FIG. 1 showing the upper attaching system as attached to the roof hand-hold of a golf cart, according to preferred embodiments of the present invention.

FIG. 6 is a perspective view of Detail 6 of FIG. 1 showing the upper attaching system 102 as attached to the roof hand-hold 121 of a golf cart 106, according to preferred embodiments of the present invention. As shown, the upper tie strap(s) 115 are tied onto the roof hand-hold(s) 121 on the roof 108 of the golf cart 106. Under appropriate circumstances, for example, using a standard E-Z-Go® golf cart, this attaching method is most preferable. Upon reading the teachings of this specification, those with ordinary skill in the art, will now understand that, under appropriate circumstances, the upper attaching system 102' method, detailed and described above in FIG. 8, FIG. 9 and FIG. 10, may suffice.

Figure 7:
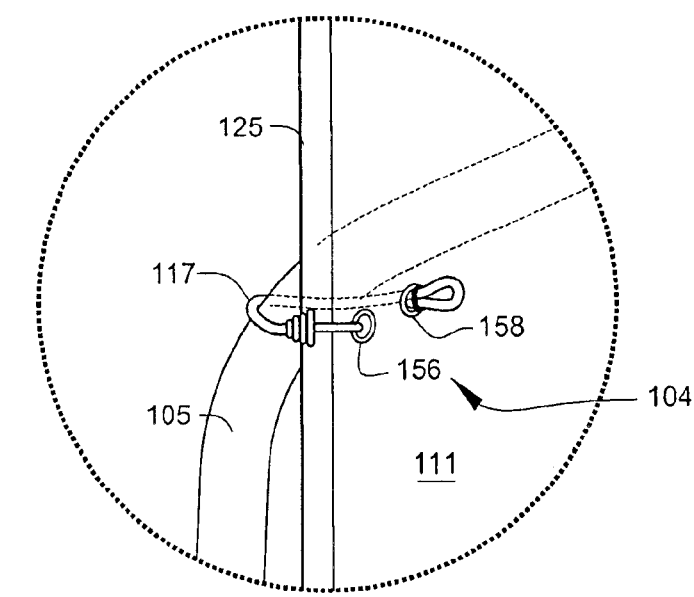
FIG. 7 is a perspective view, partially in section, of detail 7 of FIG. 1 showing the lower attaching system as attached to the armrest of a golf cart.

FIG. 7 is a detailed perspective view of the lower attaching system 104 as attached to the armrest 105 of a golf cart 106, according to preferred embodiments of the present invention. As shown, the lower bungee cord(s) 117 wraps around the armrest(s) 105 and hooks into the first lower grommet 156 of the lower attaching system 104. Preferably, there is a lower attaching system 104 for each side (driver and passenger sides) of the golf cart shading system 100. Upon reading the teachings of this specification, those with ordinary skill in the art, will now understand that, under appropriate circumstances, considering issues such as user preference, economic considerations, environmental considerations, durability, etc., other attaching means, such as tie straps, snaps, or hook and loop type fasteners, etc., may suffice.

FIG. 8 is a perspective view of the golf cart shading system 100 illustrating the use of an alternate upper attaching system 102' as attached to a golf cart 106, according to the alternate preferred embodiment of the present invention. As previously discussed, depending on the type of golf cart, there may not be roof hand-holds 121 available to attach the upper attaching system 102 of the golf cart shading system 100 to the golf cart 106. Therefore, an alternate preferred method of attaching the golf cart shading system 100 to the golf cart 106 may be used. The alternate upper attaching system 102' uses the fifty-two-inch upper tie strap 115' strapped across the top of the roof 108 and ties onto an upper tie strap 115. Additionally, the upper alternate attaching system 102' uses the upper bungee cord(s) 113 strapped around the front roof support(s) 101 and hooks onto itself, also as shown in greater detail in FIG. 10.

FIG. 9 is a perspective view of Detail 9 of FIG. 8. FIG. 9 shows an alternate upper attaching system 102' 52-inch upper tie strap 115' and upper bungee cord 113 as attached to a golf cart 106, according to the embodiment of FIG. 1 of the present invention.

FIG. 10 is a perspective view of Detail 10 of FIG. 8. FIG. 10 shows an alternate preferred upper attaching system 102' upper bungee cord 113 as it wraps around the front roof support(s) 101 of a golf cart 106. Preferably, each upper bungee cord 113, as shown, straps around a front roof support 101 and hooks onto itself. Upper bungee cords 113 aid in keeping the shade-body 111 of the golf cart shading system 100 taut against the rear roof support(s) 103.

Figure 11:
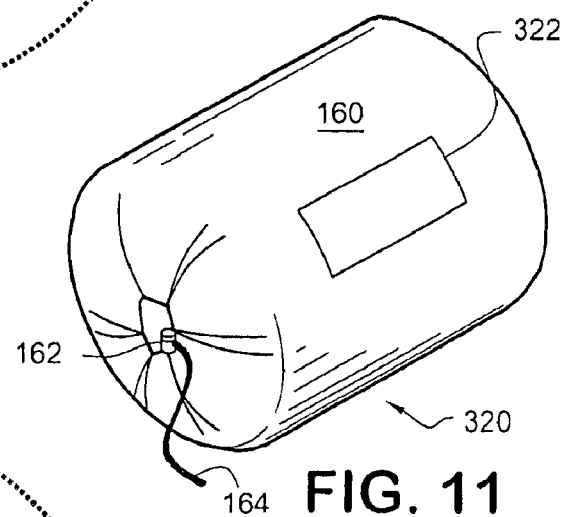
FIG. 11 is a perspective view of a storage bag used to store the golf cart shading system, according to the preferred embodiments of the present invention.

FIG. 11 is a perspective view of a storage bag 160 (embodying herein at least one storage bag) used to store the golf cart shading system 100, according to the preferred embodiments of the present invention. The storage bag 160 is preferably made from the same material as the golf cart shading system 100 and is of a sufficient size to store the golf cart shading system 100. The storage bag 160 is preferably designed similarly to a standard duffle bag, with a cord lock 162 of a typical type to hold the drawstring 164 of the storage bag 160 closed. Under appropriate circumstances, the storage bag 160 may be made of other suitable materials and of other suitable designs, including the closure mechanism. When not in use, the storage bag 160 is preferably capable of being compactly folded and stored. Most preferably, the golf cart shading system 100 is provided as a kit 320 and includes bag 160, shade body 111, lower attaching system 104, upper attaching system 102, bungee cords 113 and 117, and instructions 322. This arrangement embodies herein a kit comprising: at least one golf cart shading system for at least one occupant compartment of a golf cart, comprising in combination: shading means for shading at least one rear portion of the at least one occupant compartment of the golf cart; and aperture means for permitting passage through said shading means of at least one rear support bracket for supporting at least one piece of golf equipment outside said shading means; at least one storage bag; and at least one set of installation instructions.

Figure 12:
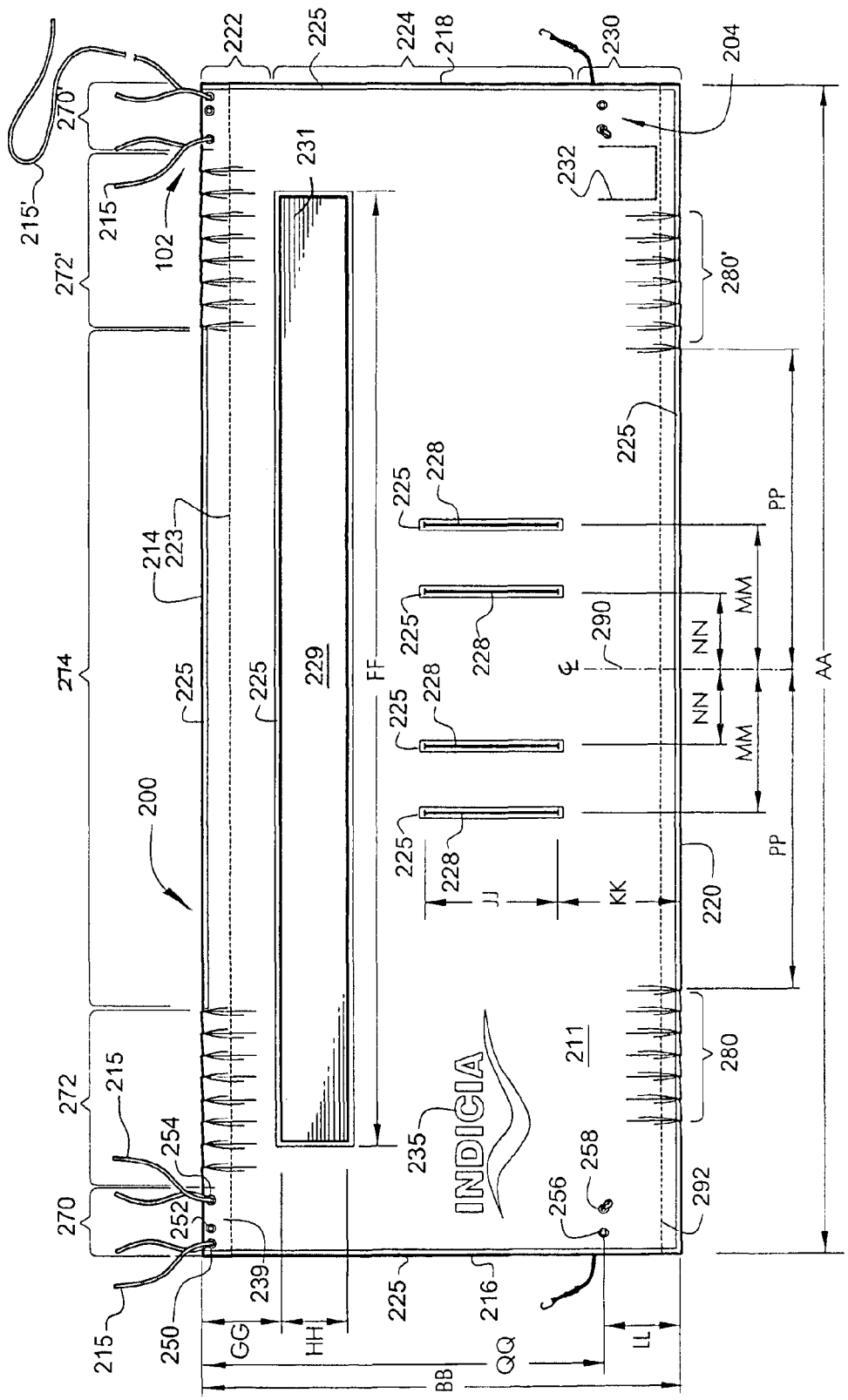
FIG. 12 is a diagrammatic top view for diagrammatically illustrating dimensions of the golf cart shading system, according to an alternate preferred embodiment of the present invention.

FIG. 12 is a diagrammatic top view for diagrammatically illustrating dimensions. FIG. 12 shows a preferred layout view of the golf cart shading system 300, according to an alternate preferred embodiment of the present invention. In an alternate preferred embodiment, the golf cart shading system 200 preferably comprises a shade-body 211, which is essentially rectangular, as shown. The shade-body 211 most preferably comprises high-grade twill. However, under appropriate circumstances, the material could also be comprised of denim, vinyl, netting, or screening-type fabric. In a preferred embodiment, length AA is the length of the shade-body 211 needed to surround the rear portion of the occupant compartment 110 of a golf cart 106. Under appropriate circumstances, for example, using a standard E-Z-Go® golf cart, available from E-Z-Go Textron, Augusta, Ga., USA, length AA is preferably about ninety-inches. Upon reading the teachings of this specification, those with ordinary skill in the art, will now understand that, under appropriate circumstances, considering issues such as golf cart size, etc., other dimension of length AA, such as shorter or longer, may suffice. Preferably, width BB is the width of the shade-body 211 needed to cover from about the roof 108 to about the bottom of the seating area(s) 112 of the rear portion of the occupant compartment 110. Under appropriate circumstances, for example, using a standard E-Z-Go® golf cart, width BB is preferably about forty-two-inches. Upon reading the teachings of this specification, those with ordinary skill in the art, will now understand that, under appropriate circumstances, considering issues such as golf cart size, etc., other dimension of length BB, such as wider or narrower, may suffice. The shade-body 211, as shown, preferably includes a top section 222, a middle section 224 and a bottom section 230. Also as shown, the shade-body 211 preferably includes a top edge 214, a first side edge 216, a second side edge 218, and a bottom edge 220. Preferably, the periphery of the first side edge 216 and second side edge 218 are finished with bias tape 225, which is commonly known and widely available for use in finishing raw edges of fabric or other materials. However, as stated above, under appropriate circumstances, the periphery of the first side edge 216 and second side edge 218 may be finished in accordance with other suitable means, such as rolled edges or hems. The bottom edge 220 is preferably finished in preferably about a one-inch bottom hem 292. Under appropriate circumstances, however, the bottom edge 220 may be finished according to other suitable means, such as rolled edges or with bias tape, or may be larger or smaller than about one-inch.

Top section 222 of the shade-body 211 preferably includes a top hem 223 of preferably about 2 inches over the entire length AA, a top edge 214, a first side edge 216, and a second side edge 218. The top section 222 of the shade-body 211, preferably, also includes first end portions 270 and 270', second end portions 272 and 272', and a middle portion 274, as shown. Preferably, the first end portions 270 and 270' comprise the upper attaching system 202. The first end portions 270 and 270', most preferably, are six-inches in length from the first side edge 216 and the second side edge 218, respectively, with each first end portion 270 and 270' comprising, preferably, at least two upper tie straps 215 (or at least one upper tie strap 215 and at least one fifty-two-inch strap 215') and three upper grommets, of a typical type, a first upper grommet(s) 250, a second upper grommet(s) 252, and a third upper grommet(s) 253 (for a total of preferably at least three upper tie straps 215 and at least one fifty-two-inch upper tie strap 215', and at least six upper grommets 250, 252 and 254). The first end portions 270 and 270' are preferably reinforced with additional reinforcing material 239. Preferably, the additional reinforcing material 239 is about a four-inch by six-inch piece of material folded and sewn onto the corner of the shade-body 211 before the top hem 223 is sewn. The upper attaching system 202 is essentially identical to the upper attaching system 102 detailed in FIG. 2, FIG. 3, and FIG. 3b.

The second end portions 272 and 272' of the top section 222 of the shade-body 211 preferably include elastic fixed within the top hem 223. Preferably, the second end portions 272 and 272' are used as tensioners to aid in a tighter fit of the golf cart shading system 200 when installed on the golf cart 106. Under appropriate circumstances, for example, using a standard E-Z-Go® golf cart, when stretched, each of the second end portions 272 and 272' are preferably about nine-and one-half-inches. Upon reading the teachings of this specification, those with ordinary skill in the art, will now understand that, under appropriate circumstances, considering issues such as golf cart size, etc., other dimension of length of second end portions 272 and 272', such as shorter or longer, may suffice.

The middle portion 274 of the top section 222 of the shade body 211 is preferably flat, so as to be taut against the rear roof supports 103 and under the roof 108 of the golf cart 106. Most preferably, the middle portion 274 is finished with bias tape 225 to provide additional protection of the material against wear. However, under appropriate circumstances, additional protection of the material of the middle portion 274 of the top section 222 of the shade-body 211 may be accomplished by other suitable means, such as a rolled edge or reinforced with additional material. Under appropriate circumstances, for example, using a standard E-Z-Go® golf cart, the length of middle portion 274 is most preferably about thirty-three-inches inches. However, under appropriate circumstances, the length of middle portion 274 may be longer or shorter, depending on the specific type of golf cart for which the golf cart shading system 100 is designed.

The middle section 224 of the shade-body 211 preferably includes a first side edge 216, a second side edge 218, a window 229 and slot(s) 228. Additionally, the middle section 224 is sized such that indicia 235 may be placed appropriately for advertising, owner identification, etc. The window 229, as shown, is preferably centered equidistantly from the first side edge 216 and the second side edge 218, and at a distance GG from the top edge 214 of the shade-body 211. Under appropriate circumstances, for example, using a standard E-Z-Go® golf cart, the distance of GG is preferably about five-inches inches. However, under appropriate circumstances, distance GG may be longer or shorter, depending on the specific type of golf cart for which the golf cart shading system 100 is designed. The window 229 preferably has two sides of height HH, preferably about eight-inches, and a top and bottom of length FF, preferably about fifty-eight-inches. However, under appropriate circumstances, the dimensions HH and FF of the window may vary, depending on the type of golf cart for which the golf cart shading system 100 is designed. Preferably, the window 229 is comprised of screening 231. However, under appropriate circumstances, the window 229 may have a window flap, similar to window flap 126, as shown in FIG. 2 and FIG. 13, which can be used to cover the window 229. In a preferred embodiment, the sides and the top and bottom of the window 229 are preferably finished with bias tape 225. However, under appropriate circumstances, the sides and the top and bottom of the window 229 may be finished by other suitable methods, such as rolled edge or hemmed. The screening 231 is preferably accomplished by attaching, most preferably by sewing, a screen-type material to the internal side of the shade-body 211 that is preferably about one-inch larger in length and width than the window 229. However, under appropriate circumstances, the screening 231 in the window 229 may be attached to the golf cart shading system 200 by other appropriate means and may be attached to the external side of the golf cart shading system 200. Additionally, under appropriate circumstances, a user may choose to have the shade-body 211 with or without a window 229, a window flap (similar to 126), or neither. Furthermore, even if the shade-body 211 of the golf cart shading system 200 has a window 229, a user may choose to eliminate screening 231.

The slot(s) 228, most preferably four in number, are preferably positioned such that the rear storage compartment 107 rear equipment support bracket(s) 109 can easily pass through. This placement allows for unfettered access, from outside the golf cart 106, to golf clubs and equipment that may be stored in the rear storage compartment 107 of the golf cart 106 and allows the golf cart shading system 200 to fit closer around the rear portion of the occupant compartment 110. Under appropriate circumstances, for example, using a standard E-Z-Go® golf cart, length JJ, length of slot(s) 228, is preferably about twelve-inches; distance KK, placement of the bottom of slot(s) 228 from the bottom edge 220 is preferably about ten-inches; with the slot(s) 228 furthest from the centerline of the golf cart shading system 200 positioned distance MM, preferably about twelve and one-half-inches, from the centerline 290 of the golf cart shading system 200; and the inner slot(s) 228 positioned distance NN from the centerline 290 of the golf cart shading system 200, preferably about six-inches. Upon reading the teachings of this specification, those with ordinary skill in the art, will now understand that, under appropriate circumstances, considering issues such as golf cart dimensions, economics, durability, etc., other length JJ, distance KK, distance MM, and distance NN, such as longer or shorter dimensions than described, may suffice.

The four preferable slot(s) 228, are preferably finished with bias tape 225, as shown in FIG. 5, which is commonly known and widely available for use in finishing raw edges of fabric or other materials. However, under appropriate circumstances, for example, the slot(s) 228 may be finished with a rolled edge or other acceptable finishing method.

The bottom section 230 of the shade-body 211 includes a first side edge 216, a second side edge 218, a bottom edge 220, the lower attaching system 204, bottom gathered portions 280 and 280', and internal pocket 232, as shown. The bottom edge 220 is preferably finished in preferably about a one-inch bottom hem 292. Preferably, bottom gathered portions 280 and 280' of the bottom hem 292 are comprised of elastic fixed within the bottom hem 292. The edge of bottom gathered portions 280 and 280' closest to the centerline 290 of the shade-body 211 are positioned distance PP, preferably about sixteen and one-half-inches, from the centerline 290 of the shade-body 211 and preferably include elastic fixed within the bottom hem 223. Preferably, bottom gathered portions 280 and 280' are used as tensioners to aid in a tighter fit of the golf cart shading system 200 around the seating area 112 when installed on the golf cart 106. Under appropriate circumstances, for example, using a standard E-Z-Go® golf cart, when unstretched, each of the bottom gathered portions 280 and 280' are preferably about four and one-half-inches in length. Under appropriate circumstances, the length of bottom gathered portions 280, 280', and distance PP may also be longer or shorter, depending on the specific type of golf cart for which the golf cart shading system 100 is designed. Moreover, under appropriate circumstances, the bottom edge 220 may be finished, according to other suitable means, such as rolled edge or with bias tape, or may be larger or smaller than about one-inch and bottom gathered portion 280 and 280' may not be comprised of elastic. The lower attaching system 204 and internal pocket 232 are essentially identical to the lower attaching system 104 and internal pocket 132 detailed in FIG. 2 and FIG. 4. However, the distance LL, the distance from the bottom edge 220 to the centerline of the lower grommets 256 and 258, is preferably about four-inches and the distance V, the distance from the lower reinforcement 119 to the bottom edge 120, as shown in FIG. 4, is preferably about three-inches. Under appropriate circumstances, the distances LL and V may vary, depending on the type of golf cart for which the golf cart shading system 100 is designed. Also, the distance QQ, the distance from about the roof 108 to the centerline of the lower grommets 256 and 258, is preferably about thirty-eight-inches. Under appropriate circumstances, the distance QQ may vary, depending on the type of golf cart for which it is designed.

In addition to providing shading, under appropriate circumstances, the present invention also assists in climate control within the rear portion of the occupant compartment 110 of a golf cart 106. For example, it may protect the rear portion of the occupant compartment 110 from dust, wind, rain or other undesired elements. Preferably, the golf cart shading system 100 provides cooling of the rear portion of the occupant compartment 110 by the air circulation created by the enclosure of the shade-body 111.

It should be noted that the dimensions described above, under appropriate circumstances, may vary, due to factors such as alternate physical dimensions of golf carts, or people, movers, multiple occupant seating arrangements, etc.

FIG. 13 is a photographic view of the screening 131 in the window 129 with the window flap 126 held open by the window flap ties 127 of the golf cart shading system 100, according to a preferred embodiment of the present invention.

Figure 14:
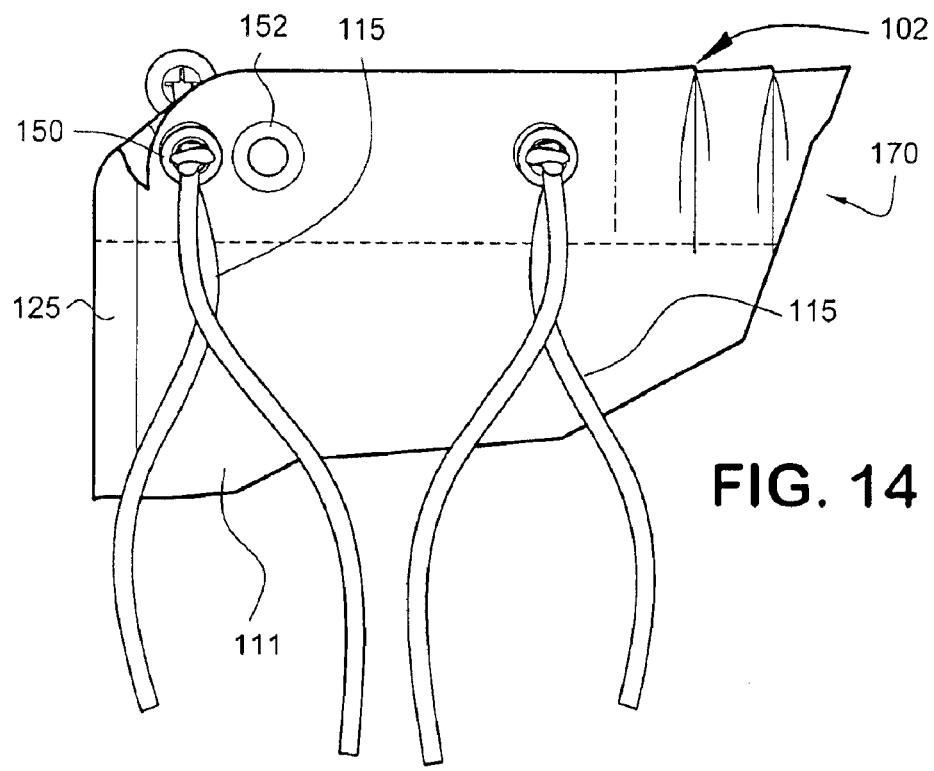
FIG. 14 is a perspective view, partially in section, of the upper attaching system with an alternate method to attach the upper tie straps to the golf cart shading system through the upper grommets, according to another preferred embodiment of the present invention.

FIG. 14 is a photographic view of the upper attaching system 102 using an alternate method to attach the upper tie straps 115 and 115' to the golf cart shading system 100 through the upper grommets 150 and 154, according to preferred embodiments of the present invention. The upper tie straps 115 and 115' (detailed in FIG. 2) are threaded through a portion of a typical grommet and threaded through the upper grommets 150 and 154, and the tie straps 115 and 115' are then knotted to hold the tie straps 115 and 115' in place.

Figure 15:
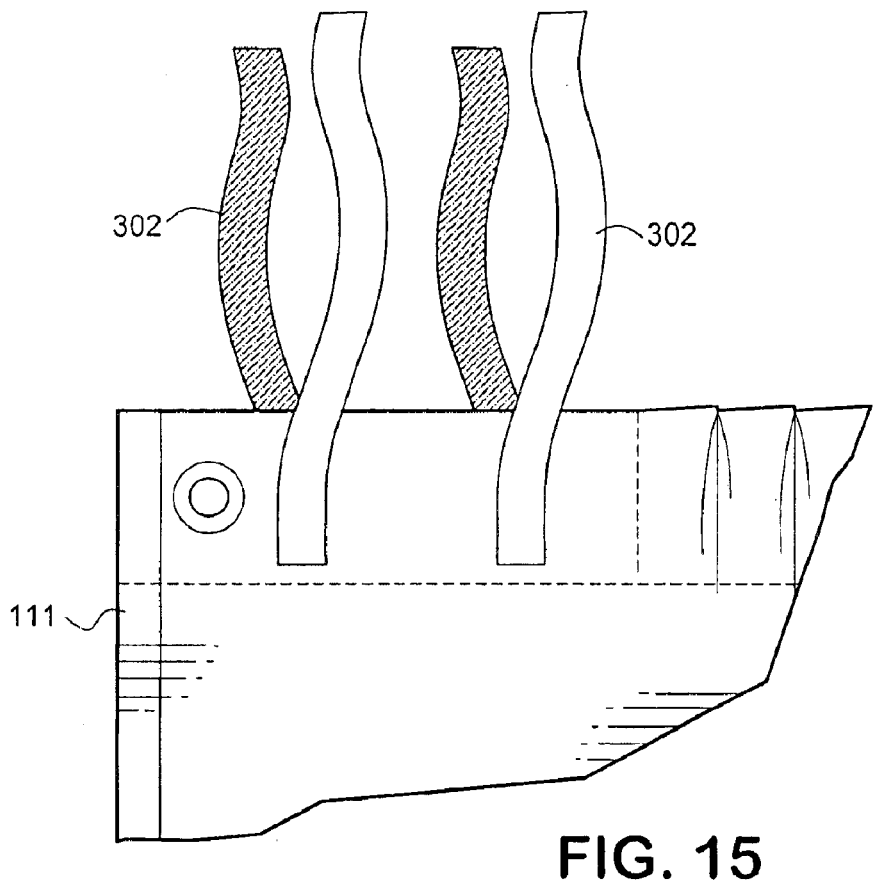
FIG. 15 is a top view, partially in section, showing an alternate hook and loop attachment embodiment for attaching the upper attaching system.
Figure 16:
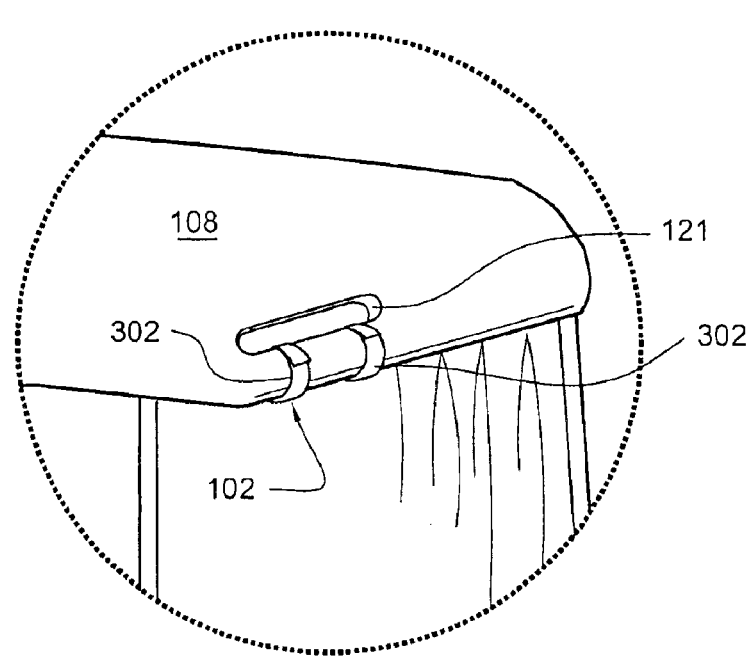
FIG. 16 is a perspective view, partially in section, showing the alternate attachment system of FIG. 15 attached to the roof hand-hold of a golf cart, according to preferred embodiments of the present invention.

FIG. 15 is a top view, partially in section, showing an alternate hook and loop attachment embodiment for attaching the upper attaching system. FIG. 16 is a perspective view, partially in section, showing the alternate attachment system of FIG. 15 attached to the roof hand-hold of a golf cart, according to preferred embodiments of the present invention. Preferably, FIG. 15 shows the upper attaching system 102 as attached to the roof hand-hold 121 of a golf cart 106, utilizing a hook and loop upper tie strap(s) 302 are tied onto the roof hand-hold(s) 121 on the roof 108 of the golf cart 106.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A golf cart shading system for at least one occupant compartment of a golf cart, comprising in combination:
   a) shading means for shading at least one rear portion of the at least one occupant compartment of the golf cart;
   b) aperture means for permitting passage through said shading means of at least one rear support bracket for supporting at least one piece of golf equipment outside said shading means;
   c) upper attachment means for attaching said shading means to at least one upper portion of the golf cart;
   d) lower attachment means for attaching said shading means to at least one lower portion of the golf cart; and
   e) window means for allowing the at least one occupant to view out the at least one rear portion of the at least one occupant compartment of the golf cart;

f) wherein said shading means, said aperture means, said upper attachment means, said lower attachmeant means, and said windows means are joined together so that they may be removed from the golf cart as one substantially rectangular piece which can be laid out substantially flat.

2. A golf cart shading system for at least one occupant compartment of a golf cart, comprising in combination:
   a) at least one shader structured and arranged to shade at least one rear portion of the at least on occupant compartment of the golf cart; and
   b) at least one aperture structured and arrange to permit passage through said at least one shader of at least one rear support bracket for supporting at least one piece of golf equipment outside said at least one shader;
   c) at least one upper attacher adapted to attach said at least one shader to at least one upper portion of the golf cart;
   d) at least one lower attacher adapted to attach said at least one shader to at least one lower portion of the golf cart; and
   e) at least one upper tensioner structured and arranged to apply tension to an upper portion of said at least one shader;
   f) wherein said at least one upper tensioner comprises elastic.

3. The golf cart shading system according to claim 2 wherein said at least one lower attacher is adapted to attach to at least one armrest portion of the at least one lower portion of the golf cart.

4. The golf cart shading system according to claim 3 wherein said at least one upper attacher is adapted to attach to at least one roof handhold portion of the at least one upper portion of the golf cart.

5. The golf cart shading system according to claim 2 further comprising
   a) at least one lower tensioner structured and arranged to apply tension to at least one lower portion of said at least one shader,
   b) wherein said at least one lower tensioner comprises elastic.

6. The golf cart shading system according to claim 2 wherein said at least one shader comprises at least one holder structured and arranged to hold at least on personal item of the at least one occupant.

7. The golf cart shading system according to claim 5 wherein said at least one shader comprises at least one holder structured and arranged to hold at least one personal item of the at least one occupant.

8. The golf cart shading system according to claim 2 wherein said at least one shader, said at least one aperture, said at least one upper attacher, and said at least one lower attacher are joined together so that they may be removed from the golf cart as one substantially rectangular piece which can be laid out substantially flat.

9. The golf cart shading system according to claim 6 wherein said at least one shader comprises at least one viewer structured and arranged to assist the at least one occupant viewing out the at least one rear portion of the at least one occupant compartment of the golf cart.

10. The golf cart shading system according to claim 2 wherein said at least one shader comprises at least one viewer structured and arranged to assist the at least one occupant viewing out the at least one rear portion of the at least one occupant compartment of the golf cart.

11. The golf cart shading system according to claim 8 wherein said at least one shader comprises at least one viewer structured and arranged to assist the at least one occupant viewing out the at least one rear portion of the at least one occupant compartment of the golf cart.

12. The golf cart shading system according to claim 11 wherein said at least one viewer comprises at least one sunlight controller structured and arranged to control a quantity of sunlight passing through said at least one viewer.

13. The golf cart shading system according to claim 12 wherein said at least one viewer comprises at least one cover adapted to cover said at least one viewer.

14. The golf cart shading system according to claim 10 wherein said at least one viewer comprises at least one cover adapted to cover said at least one viewer.

15. The golf cart shading system according to claim 13 further comprising at least one holder structured and arranged to hold at least one personal item of the at least one occupant.

16. The golf cart shading system according to claim 8 further comprising at least one golf cart.

17. The golf cart shading system according to claim 15 further comprising at least one golf cart.

18. A kit comprising:
   a) at least one golf cart shading system for at least one occupant compartment of a golf cart, comprising in combination:
   b) shading means for shading at least one rear portion of the at least one occupant compartment of the golf cart;
   c) aperture means for permitting passage through said shading means of at least one rear support bracket for supporting at least one piece of golf equipment outside said shading means;
   d) upper attachment means for attaching said shading means to at least one upper portion of the golf cart;
   e) lower attachment means for attaching said shading means to at least one lower portion of the golf cart;
   f) wherein said shading means, said aperture means, said upper attachment means, and said lower attachment means, are joined together so that they may be removed from the golf cart as one substantially rectangular piece which can be laid out substantially flat;
   g) at least one storage bag; and
   h) at least one set of installation instructions.

19. The kit according to claim 18 wherein said shading means comprises viewing means for assisting viewing out the at least one rear portion of the at least one occupant compartment of the golf cart.

20. The kit according to claim 18 wherein said shading means comprises holding means for holding at least one personal item of the at least one occupant.

* * * * *

UNITED STATES PATENT AND TRADEMARK OFFICE
CERTIFICATE OF CORRECTION

PATENT NO. : 6,869,125 B2
DATED : March 22, 2005
INVENTOR(S) : Hamm, David R.

It is certified that error appears in the above-identified patent and that said Letters Patent is hereby corrected as shown below:

<u>Column 17,</u>
Line 10, "on" should read -- one --
Line 12, "arrange" should read -- arranged --
Line 45, "on" should read -- one --

Signed and Sealed this

Thirty-first Day of May, 2005

JON W. DUDAS
*Director of the United States Patent and Trademark Office*